(12) United States Patent
Kaasten et al.

(10) Patent No.: US 7,743,022 B2
(45) Date of Patent: Jun. 22, 2010

(54) METHOD AND SYSTEM FOR SYNCHRONIZING DATA SHARED AMONG PEER COMPUTING DEVICES

(75) Inventors: Shaun A. Kaasten, Kirkland, WA (US); Jason F. Moore, Kirkland, WA (US); Balan Sethu Raman, Redmond, WA (US); Chris J. Guzak, Kirkland, WA (US); David A. Orbits, Redmond, WA (US); Sudarshan A. Chitre, Redmond, WA (US); Eric R. Flo, Sammamish, WA (US); Jeffrey M. Saathoff, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 10/376,430

(22) Filed: Feb. 28, 2003

(65) Prior Publication Data

US 2004/0172423 A1 Sep. 2, 2004

(51) Int. Cl.
*G06F 17/30* (2006.01)
(52) U.S. Cl. .................................. 707/612; 707/613
(58) Field of Classification Search .............. 707/1, 707/201, 204, 613; 395/610; 709/204; 358/400; 719/330
See application file for complete search history.

(56) References Cited

U.S. PATENT DOCUMENTS

| 4,780,821 A | 10/1988 | Crossley |
| 4,887,204 A | 12/1989 | Johnson et al. |
| 5,276,879 A | 1/1994 | Barry et al. |

(Continued)

FOREIGN PATENT DOCUMENTS

WO 02/075539 A2 9/2002

(Continued)

OTHER PUBLICATIONS

Draupe et al., "Synchronization in the MAEstro multimedia authoring environment", Proceedings of the first ACM international conference on Multimedia, 1993, p. 331-339. Retrieved from the Internet:<URL: http://portal.acm.org/ft_gateway.cfm?id=168417&type=pdf&coll=ACM&dl=ACM&CFID=66187349&Cftoken=34134708>.*

(Continued)

*Primary Examiner*—Jean B. Fleurantin
*Assistant Examiner*—Dennis Myint
(74) *Attorney, Agent, or Firm*—Shook, Hardy & Bacon, LLP

(57) ABSTRACT

Disclosed is a data synchronization service for use in a peer-to-peer computing environment. Selected data objects are copied onto selected computing devices. A service running on each device monitors data objects for changes. When a change is detected, the service sends a change notification to the other devices so that they can update their copies of the data object. A user can access a data object from any device, knowing that he will retrieve the latest version of the data object. Instead of incurring the costs of storing a large file on every device, a user "ghosts" the file on some devices. A ghosting device stores only metadata about the file rather than the entire file. The user accesses the file through the ghost: access requests are sent to a device that holds the actual contents, and those contents are presented to the user as if they were stored locally.

25 Claims, 9 Drawing Sheets

U.S. PATENT DOCUMENTS

| | | | |
|---|---|---|---|
| 5,603,019 | A | 2/1997 | Kish |
| 5,649,105 | A | 7/1997 | Aldred et al. |
| 5,684,984 | A * | 11/1997 | Jones et al. .................... 707/10 |
| 5,708,812 | A | 1/1998 | Van Dyke et al. |
| 5,729,682 | A | 3/1998 | Marauis et al. |
| 5,844,553 | A | 12/1998 | Hao et al. |
| 5,968,121 | A | 10/1999 | Logan et al. |
| 6,049,809 | A | 4/2000 | Raman et al. |
| 6,085,199 | A | 7/2000 | Rose |
| 6,119,116 | A | 9/2000 | Rose |
| 6,147,773 | A * | 11/2000 | Taylor et al. ................. 358/400 |
| 6,161,104 | A * | 12/2000 | Stakutis et al. ................ 707/10 |
| 6,295,541 | B1 * | 9/2001 | Bodnar et al. ............... 707/203 |
| 6,324,571 | B1 | 11/2001 | Hacherl |
| 6,381,627 | B1 | 4/2002 | Kwan et al. |
| 6,397,192 | B1 * | 5/2002 | Notani et al. ................... 705/9 |
| 6,505,214 | B1 | 1/2003 | Sherman et al. |
| 6,549,916 | B1 * | 4/2003 | Sedlar ........................ 707/200 |
| 6,643,670 | B2 | 11/2003 | Parham et al. |
| 6,654,771 | B1 | 11/2003 | Parham et al. |
| 6,718,352 | B1 * | 4/2004 | Dang et al. .................. 707/205 |
| 6,751,634 | B1 | 6/2004 | Judd |
| 6,879,564 | B2 | 4/2005 | Parham et al. |
| 2002/0019857 | A1 | 2/2002 | Harjanto |
| 2002/0095497 | A1 | 7/2002 | Satagopan et al. |
| 2002/0099728 | A1 | 7/2002 | Lees et al. |
| 2002/0120785 | A1 | 8/2002 | Somalwar et al. |
| 2002/0133507 | A1 * | 9/2002 | Holenstein et al. .......... 707/200 |
| 2002/0165981 | A1 * | 11/2002 | Basturk et al. .............. 709/242 |
| 2002/0194171 | A1 | 12/2002 | Judd et al. |
| 2003/0130984 | A1 * | 7/2003 | Quinlan et al. .................. 707/1 |
| 2003/0172070 | A1 * | 9/2003 | Sawadsky et al. ............. 707/10 |
| 2003/0182422 | A1 * | 9/2003 | Bradshaw et al. ........... 709/225 |
| 2004/0003086 | A1 | 1/2004 | Parham et al. |
| 2004/0059705 | A1 * | 3/2004 | Wittke et al. .................... 707/1 |
| 2004/0068524 | A1 * | 4/2004 | Aboulhosn et al. .......... 707/200 |
| 2004/0210767 | A1 | 10/2004 | Sinclair et al. |
| 2005/0055382 | A1 * | 3/2005 | Ferrat et al. ................. 707/201 |
| 2005/0086300 | A1 * | 4/2005 | Yeager et al. ................ 709/204 |
| 2007/0016915 | A1 * | 1/2007 | Mukundan et al. .......... 719/330 |
| 2007/0239796 | A1 * | 10/2007 | Ju et al. ....................... 707/201 |

FOREIGN PATENT DOCUMENTS

| | | |
|---|---|---|
| WO | 02/077862 A1 | 10/2002 |

OTHER PUBLICATIONS

Buszko et al., "Decentralized ad-hoc groupware API and framework for mobile collaboration" Proceedings of the 2001 International ACM SIGGROUP Conference on Supporting Group Work, 2001, p. 5-14. Retrieved from the Internet:< URL: http://portal.acm.org/ft_gateway.cfm?id=500291&type=pdf&coll=ACM&dl=ACM&CFID=66187349&Cftoken=34134708>.*

U.S. Appl. No. 11/111,733, filed Apr. 22, 2005, Karas et al.

U.S. Appl. No. 11/111,895, filed Apr. 22, 2005, Brezak et al.

CN Office Action Mar. 30, 2007, CN App 200410007099-4.

CN Office Action Jan. 18, 2008, CN App 200410007099-4.

Chinese Third Office Action for Application No. 200410007099.4, mailed Sep. 5, 2008.

Chinese Fourth Office Action for Application No. 200410007099.4, mailed Mar. 13, 2009.

Chinese Final Rejection for Application No. 200410007099.4, mailed Jun. 26, 2009.

European Patent Office Action for Application No. 04 001 084.5 - 2201, mailed Aug. 8, 2006.

Richard G Guy, et al., "Implementation of the Ficus Replicated File System", Proceedings of the Summer USENIX Conference, Jun. 30, 1990, pp. 63-71, XP002234187.

SYNCML Consortium, "SyncML Sync Protocol, version 1.0", Internet, Dec. 7, 2000, XP002217356.

* cited by examiner

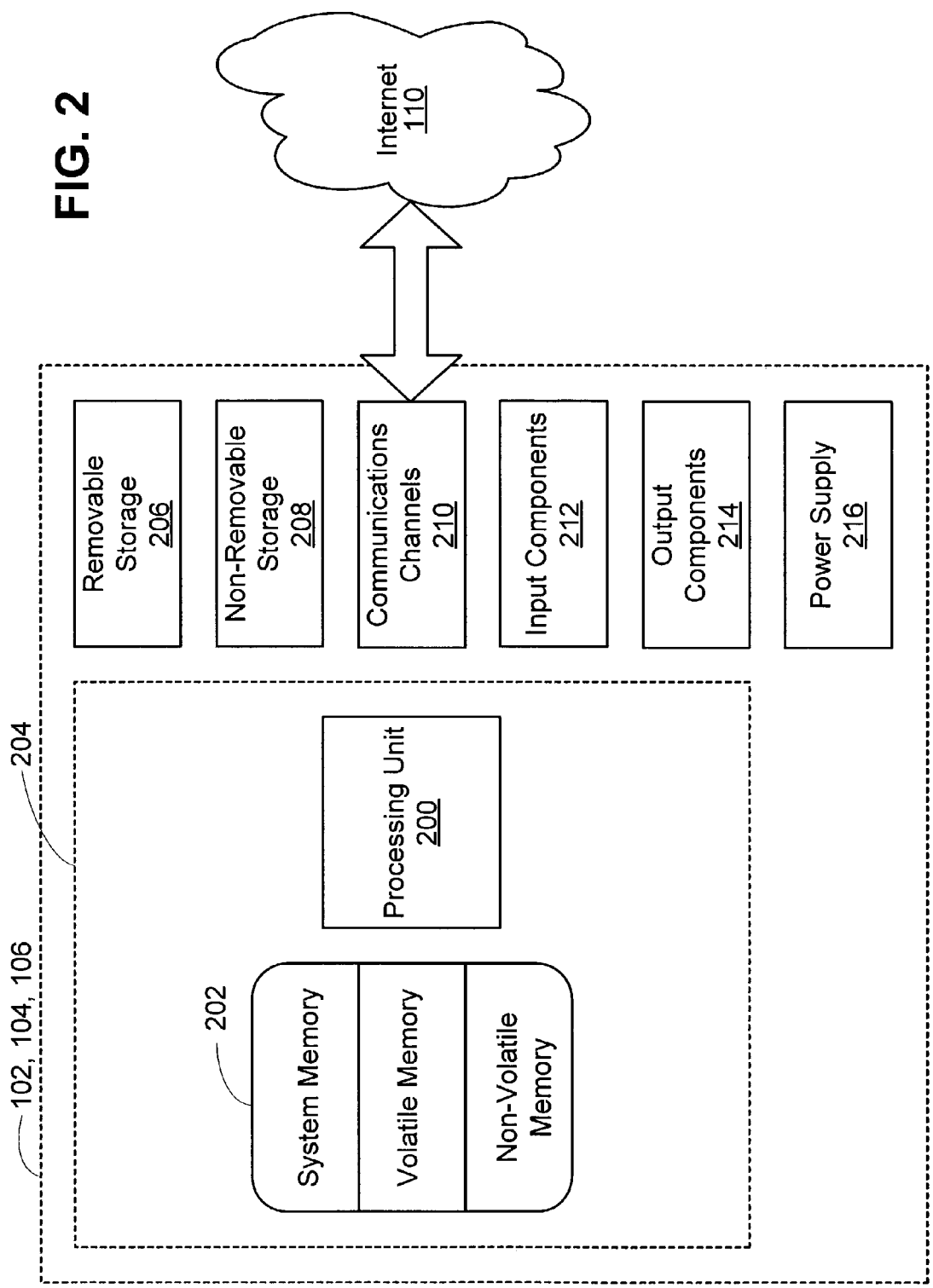

METHOD AND SYSTEM FOR SYNCHRONIZING DATA SHARED AMONG PEER COMPUTING DEVICES

RELATED APPLICATIONS

The subject matter of this application is related to that of U.S. patent Ser. No. 10/414,354, entitled "Small-Scale Secured Computer Network Group Without Centralized Management," filed Apr. 15, 2003.

TECHNICAL FIELD

The present invention is related generally to sharing data among computing devices, and, more particularly, to synchronizing data shared among peer computing devices.

BACKGROUND OF THE INVENTION

In today's active lifestyles, people often use more than one computer. Small businesses and even many homes have computers located throughout their premises and connected to one another via a local area network (LAN). Laptops and smaller computing devices, such as personal digital assistants, add to the number of computers that a typical person may use in a day.

This proliferation of computing devices, while providing undoubted advantages, can frustrate a person seeking access to a particular data file. For example, a household has multiple computers for the sake of convenience, but convenience is lost when some files are accessible only from one computer, and other files are accessible only from another. A person can also quickly become confused when faced with multiple versions of the same file. For example, an employee of a small business copies a document from his desktop computer to his laptop. While he travels, he updates the document on the laptop. Other employees do not know where to find the latest version of the document. Indeed, multiple incompatible versions of the document may proliferate throughout the business as several employees update the document without coordinating their efforts. Typically, a person wants to have access to the latest version of a particular data file regardless of where the file may be located and regardless of which computer the person happens to be using at the moment.

Larger businesses have begun to address this issue. Data files are stored on a central server. An authorized user's own computing device requests access to data files residing on the central server by using a service such as Microsoft's "CLIENT-SIDE CACHING." For added security, the business can have several central servers, each one storing copies of important data files. The central servers coordinate among themselves to ensure that a data file is always available, even when one server is inaccessible for maintenance reasons. From an administrative point of view, centralized data storage eases the tasks of enforcing data access security, of providing enough hardware to store large amounts of data, and of regularly backing up the data. From a user's perspective, centralized storage means that the user always knows where to find a data file, that the data file is essentially always available, and that the latest version of the file is the one presented to the user.

However, centralized data storage comes at a cost. Central servers represent a cost in addition to that of the users' own computers. Configuring and administering a central server environment usually requires special expertise not often found in small businesses or among home owners. People in these smaller environments often object to having a server running at all times because of cost considerations or because of fan noise.

SUMMARY OF THE INVENTION

In view of the foregoing, the present invention provides the benefits of centralized data storage without incurring the costs, financial and administrative, of a central server. In a peer-to-peer computing environment, computing devices communicate among themselves to provide access to data and to synchronize changes to the data so that the latest versions are presented to the users.

Selected data objects (files and folders) are copied onto selected computing devices. A data synchronization service running on each selected device monitors the selected data objects for changes, in some embodiments by intercepting calls to the device's file system. When a change is detected, the data synchronization service sends a notification of the change to the other devices so that they can update their copies of the data object. Thus, the copies of the data object are kept in synchrony on all of the selected devices. A user can access a data object from any of the selected devices, knowing that he will retrieve the latest version of the data object. If one device is temporarily not available, then the latest version can still be accessed from another device.

A selected device may not always be available to transmit and receive update notifications. When that is the case, other devices store their update notifications and wait for the device to become available. When the device rejoins the group, such as when a user plugs his laptop into a home LAN, that device might hold versions of data objects not in synchrony with those stored on the other devices. The data synchronization service automatically decides where the latest versions of the selected data objects are stored. Those versions are then sent to the devices with out-of-date versions.

Some files may be very large, such as audio or video clips. Instead of incurring the costs of storing such a file on every computing device, a user can choose to "ghost" the file on some devices. A ghosting device stores only metadata about the file (such as its name and version date) rather than the entire file. The user can still access the file through the ghost: the access requests are sent to a device that holds the actual contents, and those contents are then presented to the user as if they were stored locally.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1b is a block diagram showing synchronized data objects shared among the computing devices of FIG. 1a;

FIG. 2 is a schematic diagram generally illustrating an exemplary computer system that supports the present invention;

DETAILED DESCRIPTION OF THE INVENTION

Figure 1A:
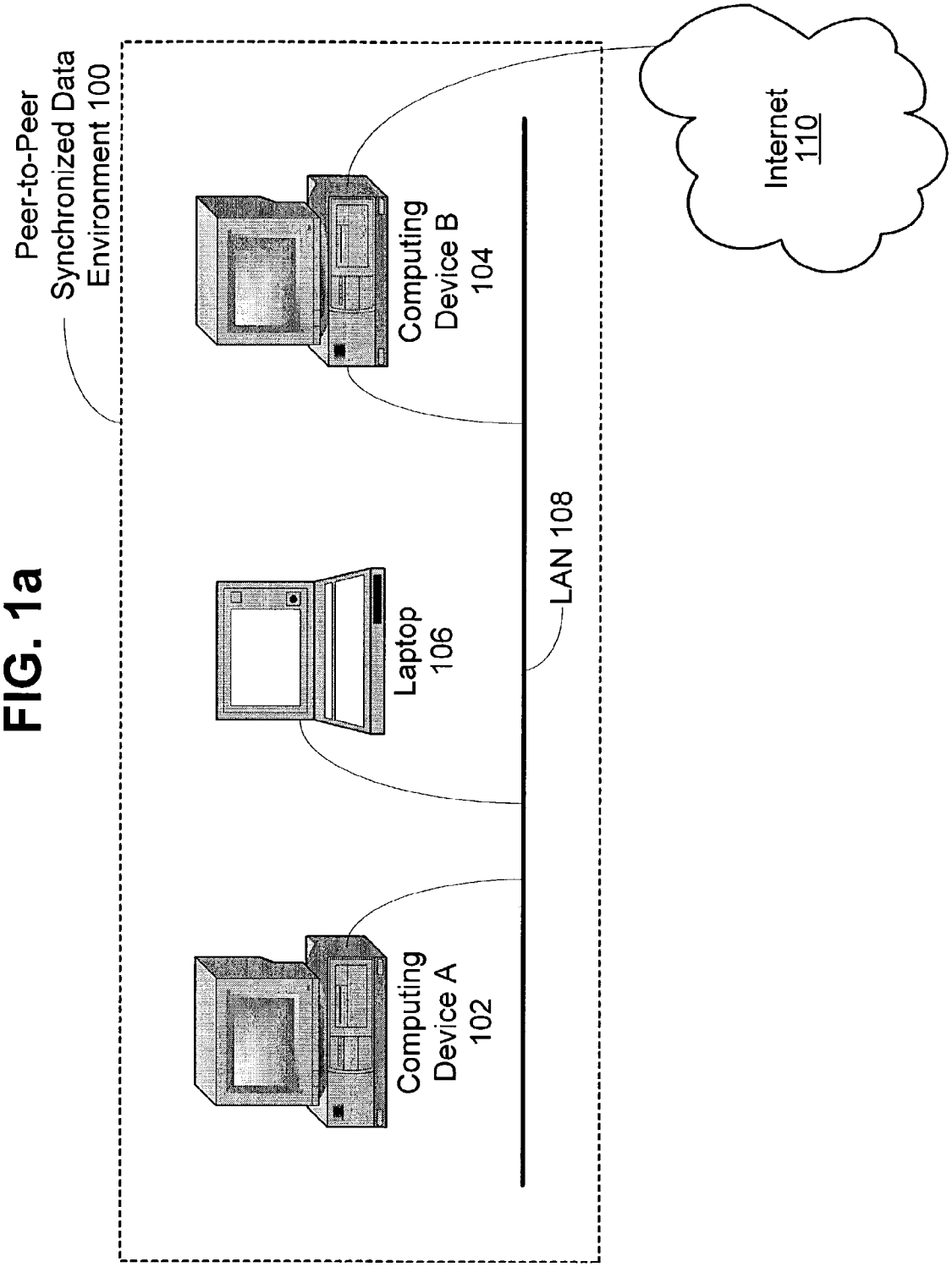
FIG. 1a is a block diagram showing three peer computing devices sharing data via a LAN.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides data synchronization services among peer computing devices. FIG. 1a shows an exemplary environment 100. Typically, the environment 100 represents a home or small business. In the environment 100 are three computing devices A 102, B 104, and a laptop 106. Being portable, the laptop 106 can readily leave the environment 100 and later return. This possibility leads to certain complications for data synchronization that are discussed below. For purposes of the present invention, these three devices 102, 104, and 106 are "peers" in that no one of them exercises control over the others. Instead, they cooperate to keep their shared data in synchronization, using techniques such as those discussed below.

The three peer computing devices 102, 104, and 106 of FIG. 1a communicate with one another via a LAN 108. Standard communications protocols exist for transporting data synchronization information among the computing devices in the shared environment 100. Computing device B 104 also provides a link to the Internet 110 that is shared by all three computing devices 102, 104, and 106. The Internet 110 is shown in FIG. 1a to indicate that the data synchronization services of the present invention can be performed even among remotely connected devices. While remote data synchronization is entirely possible, in some situations the increased communications time needed to synchronize may dissuade users from including a remote device in the synchronization environment 100.

While the present invention eases data synchronization among the devices in the environment 100, preventing devices outside of the environment 100 from accessing data synchronization information is also important. The issue of security becomes more pressing when the LAN 108 is wireless or when the environment 100 includes a remote connection, such as one to the Internet 100. In these cases, it is difficult to know if an unauthorized device is listening to data synchronization information. The issues of security in a data synchronization environment 100 are addressed in the related patent application, LVM Docket Number 218028, "Small-Scale Secured Computer Network Group Without Centralized Management," filed ???, and are not further discussed in the present application.

Figure 1B:
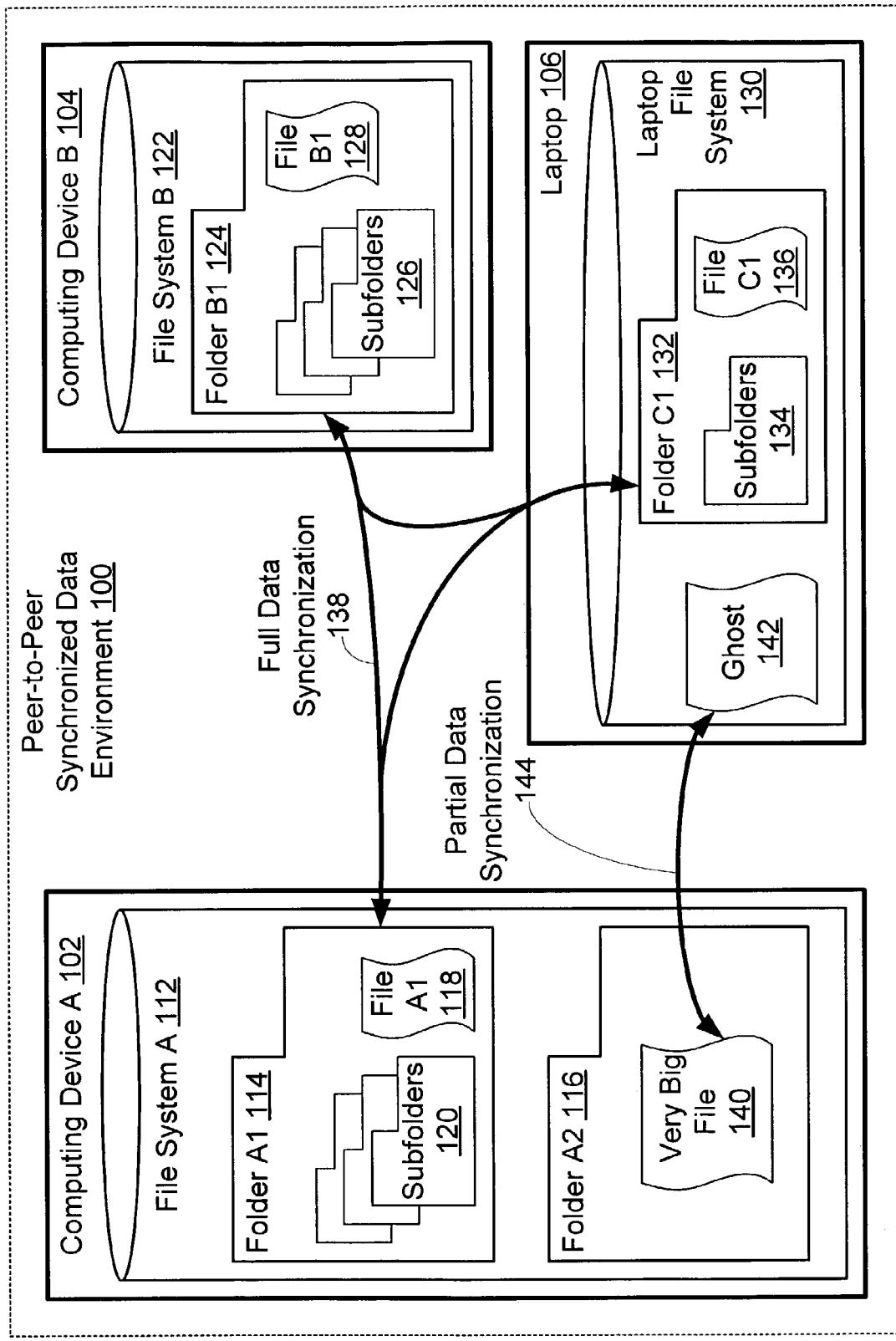

FIG. 1b presents structural details of an exemplary embodiment of the data synchronization environment 100 of FIG. 1a. In the file system 112 of computing device A 102 are two folders, A1 114 and A2 116. The entire contents of the folder A1 114 are synchronized with a counterpart folder B 1124 in the file system 122 of computing device B 104 and with a counterpart folder C1 132 in the file system 130 of the laptop 106. Synchronization means that any change to a data object (a file or folder or even a part of a file, such as a table within a database) within any one of the counterpart folders A1 114, B1 124, and C1 132 is replicated in the other folders. For example, a user of computing device B 104 creates a new file in one of the local subfolders 126. A copy of that new folder is then automatically created in the corresponding subfolders on computing devices A 102 and the laptop 106. For another example, a user of the laptop 106 updates the file C1 136 and the changes are automatically propagated to counterpart files A1 118 and B1 128. Thus, a user can log into any of these three computing devices and always retrieve the latest version of a synchronized data object, regardless of where he was logged in when that data object was last updated.

The three-headed data connection 138 indicates that none of the three computing devices 102, 104, and 106 exercises exclusive control over the data synchronization service. Rather, each device synchronizes changes made to its local files with changes made to the corresponding files on the other two devices.

There are two distinct flavors of data synchronization. In the first, called here "full-copy synchronization," complete copies of the synchronized files exist on each cooperating computing device. Note that in FIG. 1b, files and folders on different computing devices are given different reference numbers. For example, file A1 118 on computing device A 102 is synchronized with file C1 136 on the laptop 106. Synchronization makes these two files act, in some respects, as if they were one file. However, they really are separate files and are stored in their entireties on the separate computing devices. These files take up storage space on each computing device and may be accessed on one computing device even if the other computing devices are not accessible. Of course, in the latter scenario and until the other devices again become accessible, synchronizing changes to the files is not possible. (Setting up synchronization after such a period of inaccessibility is discussed below with respect to step 308 of FIG. 3a.)

The situation just described does not apply to the second flavor of data synchronization, termed "ghosted synchronization." Consider the very big file 140 in the folder A2 116 on computing device A 102. This very big file 140 may be a video clip or large database. A user wishes to access the very big file 140 when logged into the laptop 106, but does not wish to incur the enormous costs of storing a copy of this file locally. Instead, a "ghost" file 142 is created on the laptop 106. This ghost 142 does not contain the full contents of the very big file 140. Minimally, the ghost file 142 only contains a reference to the very big file 140 on its host computing device A 102. However, the ghost file 142 is synchronized with the very big file 140 so that a user on the laptop 106 can access the very big file 140 through the ghost file 142. If the user wishes to change the contents of the very big file 140, he can make that change on the laptop 106 just as if he were working directly with the very big file 140. The change is then sent, by means of the ghost file 142, to the computing device 102 and is applied to the very big file 140 itself. Thus, the user of the laptop 106 can read and modify the very big file 140 as if a synchronized copy of it existed on the laptop 106.

Unlike the case with full-copy synchronization, if the host computing device A 102 is temporarily inaccessible, then the user of the laptop 106 cannot, via the ghost file 142, access the very big file 140. Even in this ghosting case, the two-headed data connection 144 indicates that each computing device, A 102 and the laptop 106, synchronizes changes made locally, changes to either the very big file 140 itself or to the ghost file 142, respectively, with the other computing device.

These two flavors of data synchronization, full-copy and ghosting, can be intermingled in a number of ways. A folder is set up for full-copy synchronization while a file within that folder is excluded from full-copy and is instead ghosted. A folder can be full-copy synchronized between two computing devices and ghosted to a third. A ghost can locally contain a copy of some attributes or metadata of the remote file, such as its name, a thumbnail display of the file, and the like. Changes to these attributes are then synchronized in the same way that changes to a full-copy file are synchronized, while changes to the bulk of the file are synchronized by ghosting.

The computing devices A 102, B 104, and the laptop 106 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 102 may have additional features and functionality. For example, the computing device 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 102. Any such computer-storage media may be part of device 102. Device 102 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 212 such as a keyboard, mouse, pen, voice-input device, tablet, touch-input device, etc. Output devices 214 such as a display (which may be integrated with a touch-input device), speakers, and printer may also be included. All these devices are well known in the art and need not be discussed at length here.

Figure 3A:
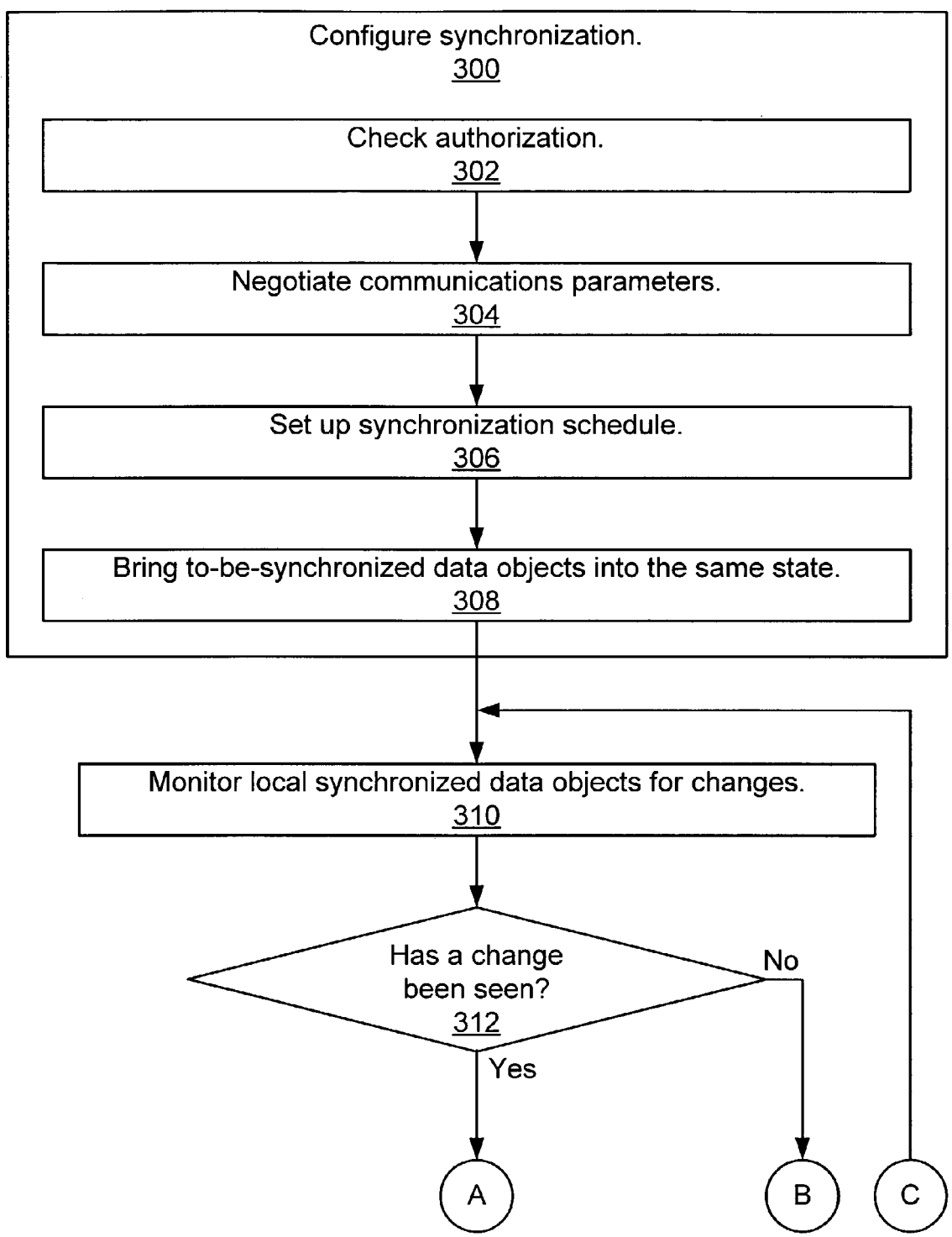
FIGS. 3a and 3b together form a flowchart illustrating an exemplary method for a data synchronization service according to the present invention.
Figure 3B:
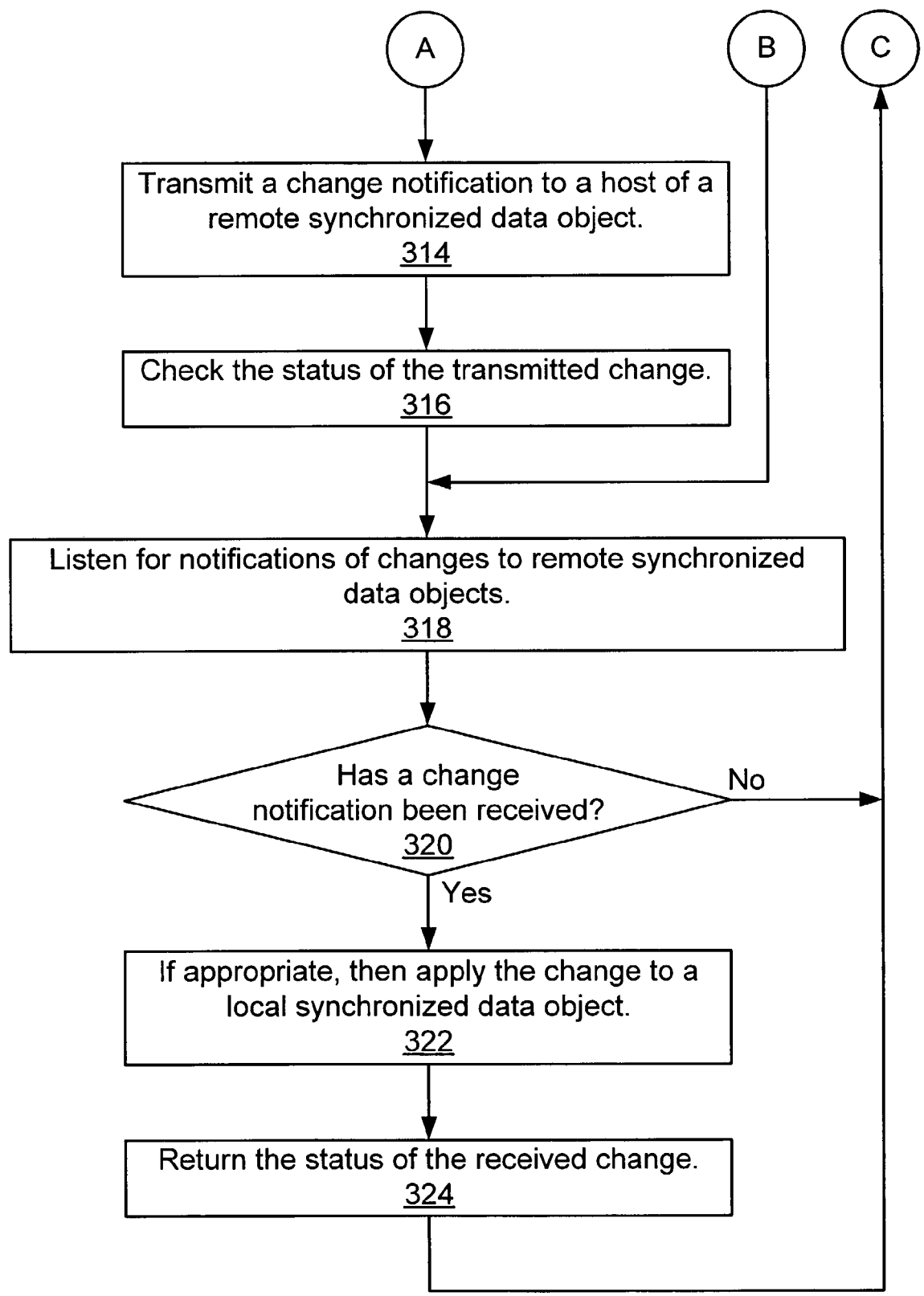

FIGS. 3a and 3b present an example of a procedure followed by devices A 102, B 104, and the laptop 106 in the peer-to-peer computing environment 100 for synchronizing data among themselves. This flowchart includes options that need not be included in every embodiment of the data synchronization service.

Before the actual synchronization begins, it is configured in step 300 of FIG. 3a. Authorization is checked in step 302. Only some devices are invited to join the synchronization environment 100, and these devices should be made to prove their identity. Even within the environment 100, some devices have different privileges than others. Privileges can be set up that prevent data synchronization from being fully symmetric. For example, a user on one device is precluded from entering changes to a file, but his device accepts changes made on other devices. For another example, and for security's sake, changes affecting the structure of a folder can be accepted only from the user of the local computing device.

In step 304, parameters for the communications that are to carry synchronization information are set up. For example, synchronization information can be limited to a percentage of the total available bandwidth so that other communications are not unduly delayed.

Step 306 is optional. In the simplest case, there is no strict schedule for synchronization: When a change to a synchronized data object is detected, a notification of the change is sent immediately to all counterpart computing devices. The amount of data traffic generated by this simplistic method can overwhelm the communications bandwidth available within the synchronization environment 100 when more than one computing device is in use at one time. To prevent this, changes can be queued up on a local computing device and only sent according to a schedule. This kind of scheduling can even out variance in information transmission rates. In addition, the queue of change notifications can be examined before sending and, if one change nullifies the effect of another change earlier in the queue, then the notification of that earlier change can be eliminated from the queue, thus reducing the total amount of transmitted change information. For clarity's sake, the flowchart of FIGS. 3a and 3b does not mention queuing of notifications.

Finally, step 308 brings to-be-synchronized data objects into the same state before beginning the ongoing synchronization service. This step is important especially when one computing device has been inaccessible to the other members of the synchronization environment 100. For example, a user takes the laptop 106 along on a business trip and updates her work files that are stored on it. During the trip, the laptop 106 is not in communication with the other computing devices A 102 and B 104. While she is away, that user's husband updates the couple's social calendar on computing device A 102. Upon return, the user reconnects her laptop 106 to the data synchronization environment 100. Because the user's work files on the laptop 106 are more up-to-date than their counterpart files on the other computing devices, in step 308, those counterpart files are updated from the laptop 106's files. Similarly, the copy of the social calendar on the laptop 106 is updated from the computing device A 102. Step 308 can be invoked even when less than a full computing device becomes accessible. For example, rather than taking the laptop 106, the user decides to simply take a removable disk out of one of the computing devices. When the disk is returned and is again part of the data synchronization environment 100, step 308 synchronizes the data objects on the disk with the remainder of the environment 100. When step 308 is complete, all of the synchronized data objects on all of the accessible devices in the environment 100 are up-to-date.

Step 308 is very useful in the embodiment depicted in FIGS. 3a and 3b. That example service triggers whenever a change is seen (see steps 312 of FIGS. 3a and 320 of FIG. 3b, discussed below). Thus, using the example of the traveling laptop 106 above, without step 308 the unsynchronized social calendar would not be automatically brought into synchronization when the laptop 106 rejoins the environment 100. Instead, that social calendar would only be synchronized when, and if, a user makes a further change to it when the laptop 106 is part of the environment 100.

In other embodiments, however, the work of step 308 is not separated out from the ongoing data synchronization service. Some embodiments monitor the time of the most recent modification of a synchronized data object. If that time is significantly different from the most recent modification time of a counterpart data object, then the more recent version should replace the out-of-date version. In this embodiment, and using the example given above, the discrepancies between the laptop 106's work files and their counterparts on the computing devices A 102 and B 104, and the discrepancies between the computing device A 102's social calendar and that on the laptop 106, are noticed in the usual course of affairs. No special step 308 is necessary. This alternative embodiment is no more difficult to understand or to implement than the change-triggered embodiment of FIGS. 3a and 3b. To avoid increasing the chance of confusion by intermingling multiple alternatives, however, the discussion below focuses on change-triggered embodiments.

With configuration complete, the ongoing data synchronization service is made up of two major parts: one, catching local changes and sending them to remote devices, and two, receiving notifications of remote changes and applying them locally. For illustrative purpose, FIGS. 3a and 3b show these two parts as occurring sequentially within one processing loop, but many other embodiments are possible. For example, each part can be a separate process or a thread in one process. Each part can also run continuously, on an event trigger, on an explicit user invocation, or periodically off a timer. The methods that are used to set up all of these alternatives are well known in the art and will not be discussed further.

Step 312 begins the first major part of the ongoing data synchronization service by looking for a change in a local data object, a data object that has been configured for synchronization. When a change is seen, a notification of that change is sent to the counterpart computing devices in step 314 of FIG. 3b. In some embodiments, one of the computing devices is set up as a "change notification clearing house" The other devices only send their change notifications to the clearing house, and the clearing house ensures that the notifications are sent on to all other devices. In a modification of an idea discussed above (in reference to step 306), the clearing house could compare received change notifications and cull out those that have no effect on the final state of synchronized data objects. Note that a clearing house can make communications more efficient, but that a clearing house does not become the master of the data synchronization environment 100. Data synchronization remains a peer-to-peer process.

The change notification itself can take several forms. A simple embodiment of a change notification, and perfectly adequate for small files, contains an identifier of the file and the entire contents of the file as changed. For larger files, a more sophisticated system can be used in which the change notification identifies how to make the change to the file, rather than simply the end result.

In some embodiments, a minimal ghost file only generates a change when it is deleted, moved, or renamed. Any other change happens on the remote host file, even though it can be caused by a user locally accessing the ghost file.

Step 316 allows the user, or the data synchronization service itself, to check the status of the transmitted change. Status information can be useful when debugging problems of sluggish response and for resetting synchronization parameters. If a user chooses to shut down a computing device, or otherwise remove it from the data synchronization environment 100, then the status information can be examined, and the shutdown paused until synchronization is complete.

Some changes can trigger a warning. For an example, consider the file system layouts portrayed in FIG. 1b. Assume a user of computing device A 102 moves file A1 118 from folder A1 114 to folder A2 116. Because no synchronization of folder A2 116 has been set up with the other two computing devices (the very big file 140 within folder A2 116 is synchronized with the ghost file 142 on the laptop 106, but that is different from synchronizing the folder A2 itself), the data synchronization service sees this move as a deletion of the file A1 118. When the change notification is sent, it results in the deletion of A1's counterpart files, file B1 128 on computing device B 104 and file C1 136 on the laptop 106. This might not be what the user had in mind, so a warning is sent to the user on computing device A 102 before the move is completed, informing the user of these possibly unexpected consequences and asking if that is really what is intended.

Steps 318 through 324 represent the second major part of the ongoing data synchronization service. A notification of a change to a remote synchronized data object is received in steps 318 and 320. In step 322, that change is applied to the local counterpart of the remote data object, if the change is appropriate. There are several reasons for that last conditional. For example, the user of the remote device has read-only access to the data object so the change is invalid and should not be applied. For another example, if the local data object is a ghost of the remote changed data object, then many possible changes should not be applied. If the change were to the contents of the ghosted file, then applying the change locally would actually cause another change to the contents of the remote host file. That change could be noticed on the remote host, and notification would again be sent to the ghosting device. The result would be, at best, useless traffic, and possibly an unending loop of change notifications. In a usual full-copy scenario, however, most changes are appropriate and are applied as received.

The status of the received change is sent in step 324 which acts as a counterpart to the status checking of step 316.

When more than one user can simultaneously access a data object for changes, it is possible for them to make conflicting updates. One solution is to simply not allow this scenario to occur. There are well known techniques for allowing only one user at a time to have write access to a data object. These techniques are easily modified to allow only one user at a time to have write access to any one of a counterpart set of synchronized data objects. Other solutions exist. For files, only the last writer's changes are implemented on all counterpart data objects, or when a conflict is detected, the changes are held in abeyance, and the user is asked which changes should be implemented. When two folders are creating with conflicting names, one can be created as requested, and the other given a name with a unique suffix. In most cases, the users are informed of the conflicts so that they may resolve them.

Figure 4:
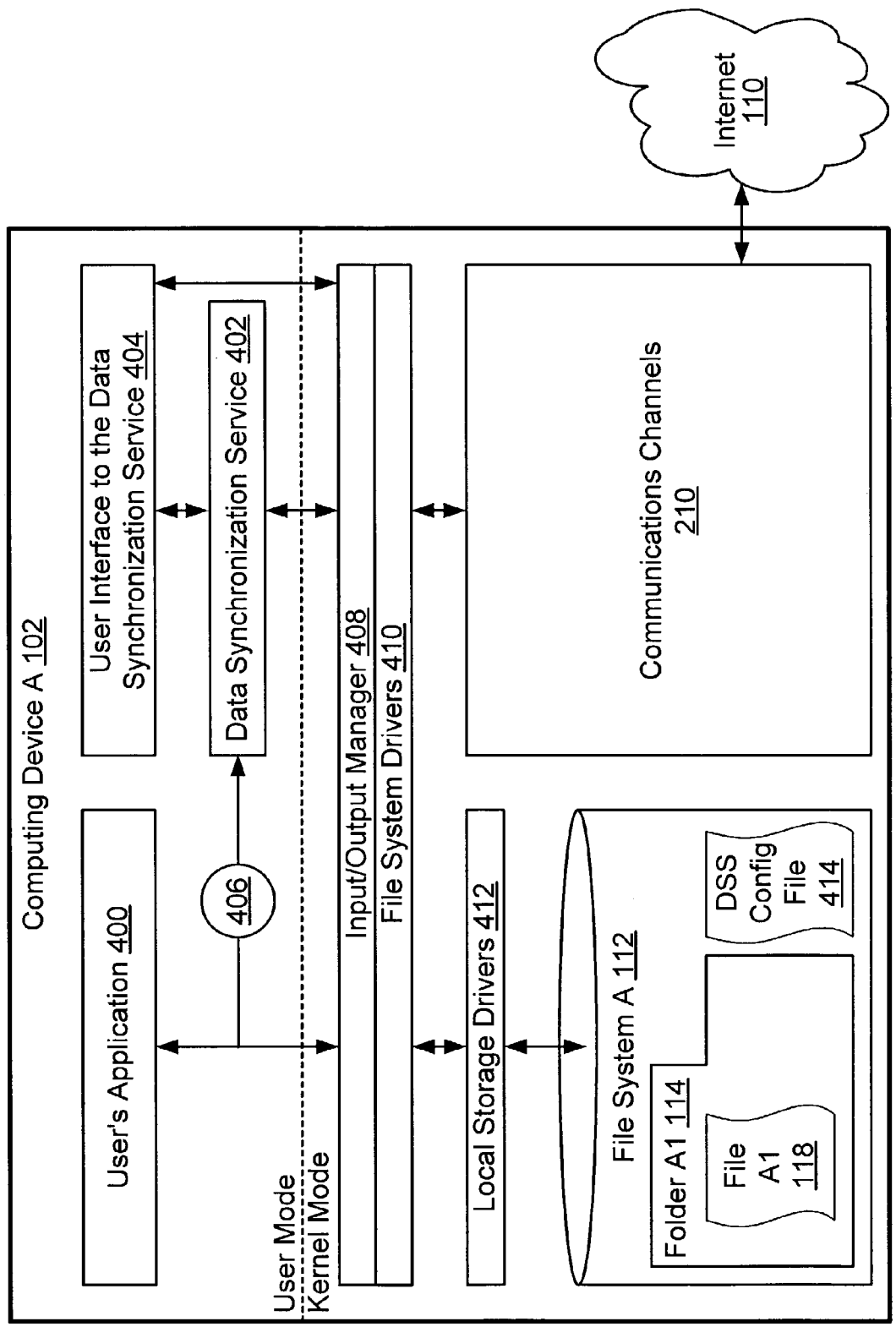
FIG. 4 is a schematic diagram of an exemplary system that provides a data synchronization service according to the present invention.

FIG. 4 presents an exemplary system that supports an embodiment of the data synchronization service as discussed above in reference to FIGS. 3*a* and 3*b*. Several of the named features in FIG. 4 are meant to denote services generally provided by typical operating systems. The particular nomenclature is not important, and the present invention is not limited to any particular operating system.

In the user mode of the computing device 102 runs one or more application programs 400. Under the direction of a user, these application programs 400 change synchronized data objects. Changes can also come from operating system utilities, such as a file system manager that implements a file name change or that creates a new folder. For clarity's sake, these utilities are not shown. The data synchronization service 402 operates with them in the same way that it operates with the application programs 400.

When a change is directed to a full-copy synchronized data object, that change is implemented on the local data object. This is shown by the dataflow connecting the application program 400, the input/output manager 408, the file system drivers 410, the local storage drivers 412, the file system A 112, and finally the target data object within the file system A 112. Via dataflow 406, the data synchronization service 402 notices the change. As appropriate, the service 402 creates a change notification to send to the computing devices that host a counterpart to the changed data object. The data synchronization service 402 uses the facilities of the operating system such as the input/output manager 408, the file system drivers 410, and the communications channels 210 to send the message. In FIG. 4, the communications channels 210 are shown connecting to the Internet 110 for communications with a remote device. In the scenario depicted in FIG. 1*a*, the communications channels 210 also connect to the LAN 108 for communications with computing device B 104 and the laptop 106.

If the local synchronized data object is a ghost file, then many changes originating in the application program 400 do not go down the dataflow through the input/output manager 408, etc., to the file system A 112. Instead, they only follow the dataflow 406 to the data synchronization service 402 and are sent out the communications channels 210.

The other direction of the data synchronization service 402, receiving change notifications from remote devices, uses the same elements. A change notification is received over the communications channels 210 and is passed up to the data synchronization service 402. If the service 402 decides that it is appropriate to implement the change, then it follows the same dataflow as used by the application programs 400: through the input/output manager 408 to the file system drivers 410 to the local storage drivers 412 and finally to the file system A 112 and the target data object.

Discussed above with reference to step 308 of FIG. 3*a* is an embodiment of the data synchronization service 402 that does not trigger on changes. Instead, it monitors the modification times of synchronized data objects. In this case, the data flow 406 is not necessary, and the data synchronization service 402 is invoked by a timer or other event. When invoked, the service 402 compares the modification times of the synchronized data objects on the computing device A 102 with the times of the counterpart data objects on the other computing devices in the data synchronization environment 100 and uses the operating system utilities shown to take appropriate action, as discussed above.

Figure 5A:
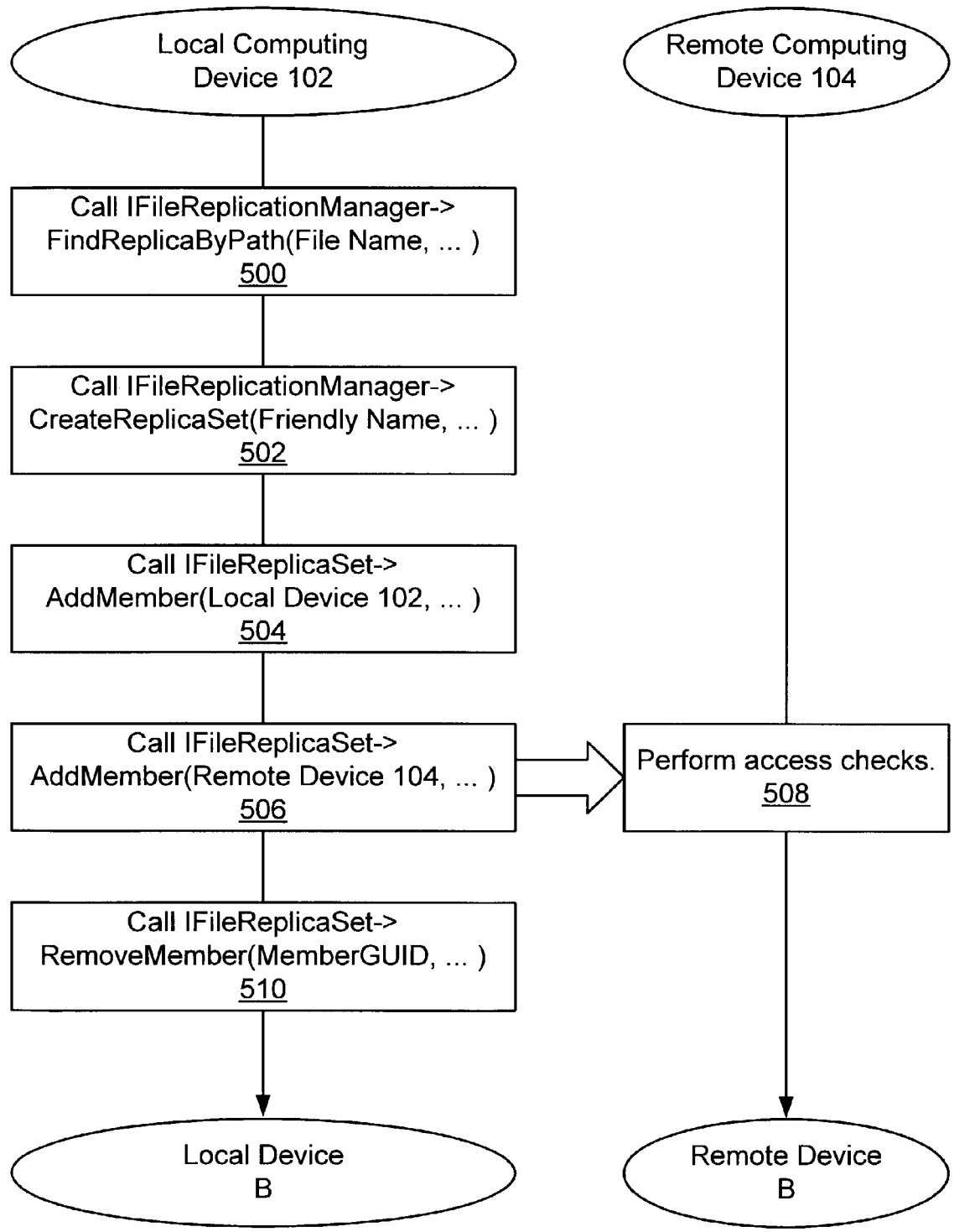
FIGS. 5a and 5b together form a flowchart of an exemplary method for configuring and initiating synchronization between two computing devices.
Figure 5B:
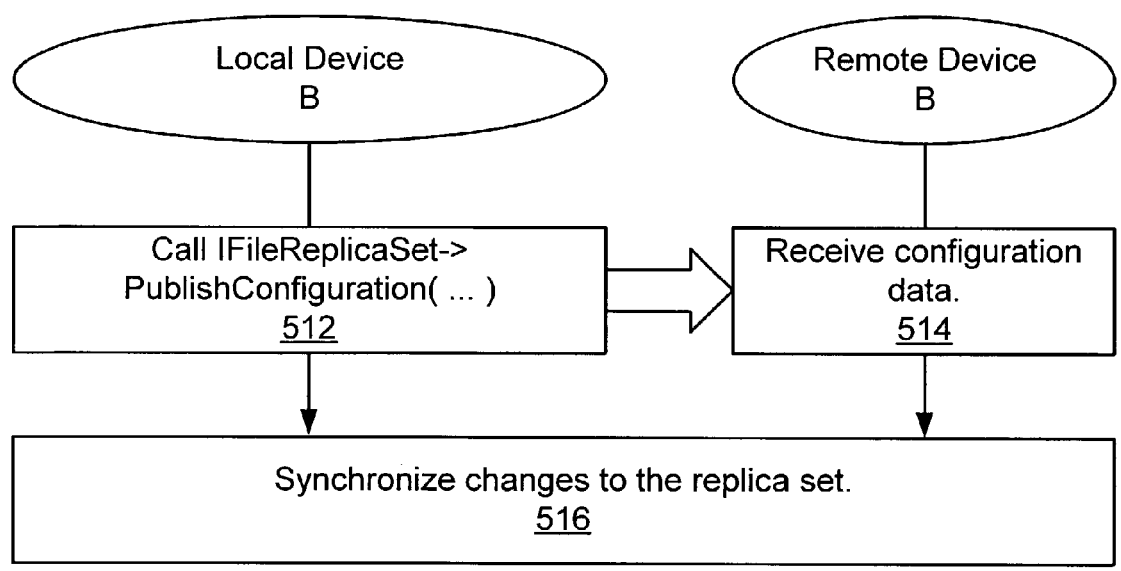

The flowchart of FIGS. 5*a* and 5*b* presents an exemplary method for initiating data synchronization. A user on computing device A 102 wishes to initiate synchronization of his local folder A2 116 with computing device B 104. In step 500 of FIG. 5*a*, the API (application program interface) IFileReplicationManager->FindReplicaByPath(path name of folder A2, . . . ) checks to see if the folder A2 116 is already being synchronized. If it is, then the API returns a pointer to a set representing the synchronization. For this example, assume that the folder A2 116 is not yet being synchronized.

The API IFileReplicationManager->CreateReplicaSet ("My Pictures", . . . ) of step 502 creates a synchronization set object. This object is used on computing device A 102 to manage the synchronization of the folder A2 116. The synchronization set object is assigned both a unique identifier (GUID) and a name more user-friendly than the GUID: "My Pictures." Synchronization parameters, such as those discussed above in reference to steps 304 and 306 of FIG. 3*a*, are set to their defaults. The API returns a pointer to the IFileReplicaSet interface, used in the following steps.

In step 504, the API IFileReplicaSet->AddMember(computing device A 102, . . . ) is called to add the computing device A 102 to the set of devices that will hold the "My Pictures" synchronization set and its counterpart folders. A number of checks are performed first: is the user authorized to set up synchronization, does the folder A2 116 exist, does the user have the necessary read and write permissions on the folder A2 116, does the "My Pictures" synchronization set conflict with an existing synchronization set, and is there enough disk space available to support synchronization. If all of these checks are successfully passed, then the API sets up folders used internally by the synchronization service 402 (such as for debugging and storing change notifications), initializes a FileReplicaMember, and initializes the data synchronization service 402 (unless it is already running for another synchronization set).

Next, the API IFileReplicaSet->AddMember(computing device B 104, . . . ) is called in step 506. This initiates step 508 on computing device B 104 which starts by initializing the data synchronization service 402 on that device (unless it is already running). The API queries computing device B 104 (possibly by using remote procedure calls) to check for permissions and to see whether the counterpart on computing device B 104 of the folder A2 116 is already being synchronized. Permissions are checked by impersonating the user of computing device A 102 to see if he has the appropriate permissions on computing device B 104. If all the checks pass, then another FileReplicaMember object is initialized.

Steps 506 and 508 are repeated with any other computing devices that are to join in the synchronized sharing of folder A2 116. If this process fails on one device, the initialization process on computing device A 102 can choose to abort the whole process by calling the API IFileReplicaSet->RemoveMember(MemberGUID, . . . ) in step 510 to remove any remote devices already successfully entered into the synchronization set.

The API IFileReplicaSet->PublishConfiguration( . . . ) in step 512 sends configuration information to all of the devices that will host synchronized copies of "My Pictures." This information, received in step 514, is stored by again impersonating the user of computing device A 102.

Finally, changes to "My Pictures" are synchronized in step 516. FIGS. 3*a* and 3*b* present the details of one embodiment of step 516.

Figure 6:
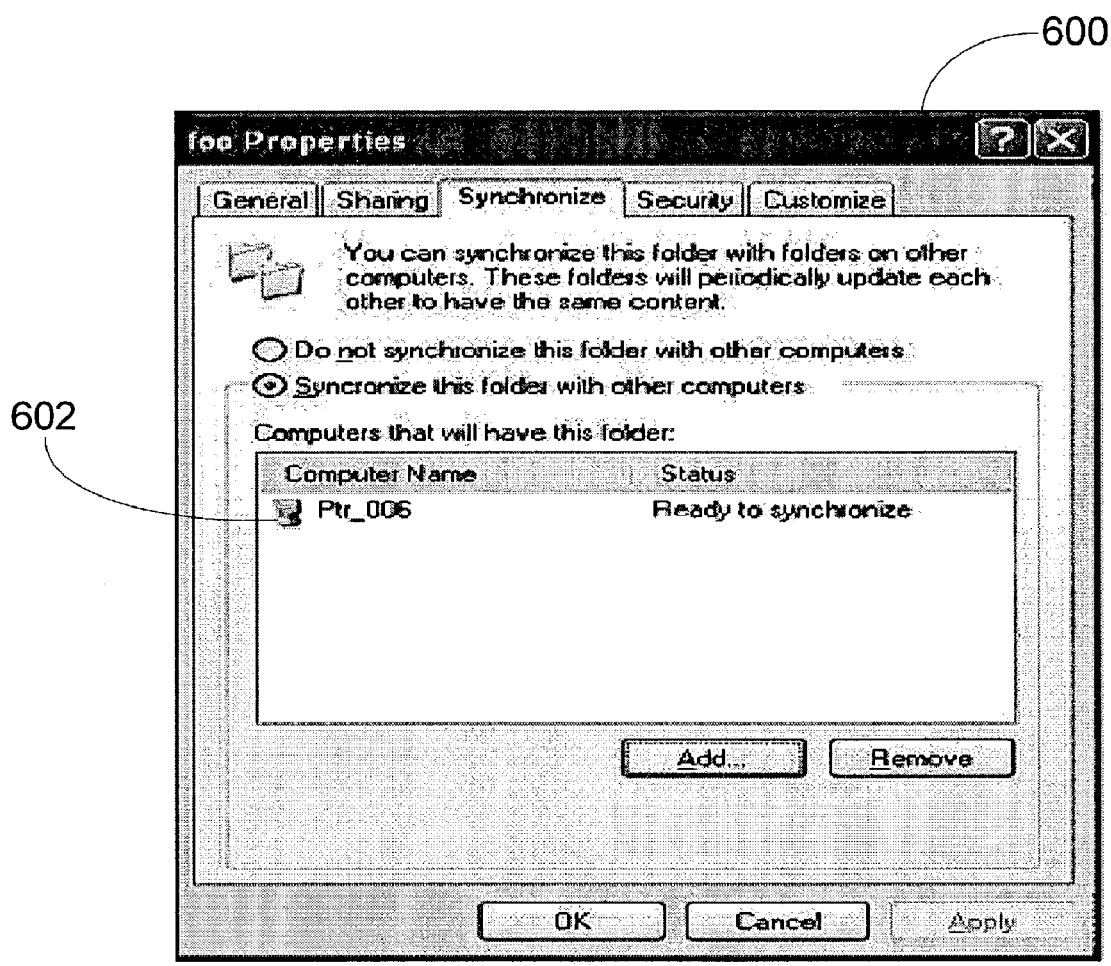
FIG. 6 is a screen shot of an exemplary user interface for configuring a data synchronization service.

The flowchart of FIGS. 5*a* and 5*b* presents internal actions for initializing data synchronization. FIG. 6 presents an external interface that a user invokes in order to set up this initialization. The exemplary screen shot 600 has tabs for configuring properties of a folder on the local computing device, here called "foo." The selected tab is used for synchronizing this folder with counterpart folders on other devices. When the user selects the radio button to synchronize this folder, steps 500 through 504 of FIG. 5*a* (or their equivalent) can be invoked. A list 602 of counterpart devices is shown, and the user can add devices to this list (corresponding to step 506 of FIG. 5*a*) or remove them (step 510).

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. A computer-implemented method of synchronizing data in a peer to peer computer system having a processor, memory, and a data storage subsystem, the computer-implemented method comprising:

providing a plurality of computing devices in the peer to peer computer system, the computing devices comprising a peer computing device and a counterpart peer computing device;

designating one of the computing devices as a change notification clearing house;

configuring a synchronization between the peer computing device comprising a peer data object and the counterpart peer computing device comprising a counterpart peer data object;

monitoring the peer data object by a synchronization service of the peer computing device for changes;

detecting a change in the peer data object of the peer computing device by the synchronization service of the peer computing device;

transmitting a change notification of the change in the peer data object from the synchronization service of the peer computing device to the change notification clearing house, wherein the transmitting step occurs via an input/output manager, a plurality of file system drivers, and a plurality of communications channels;

checking a status of the transmitted change notification;

listening for changes to the counterpart peer data object;

receiving a change notification via the change notification clearing house of a change to the counterpart peer data object from a synchronization service of the counterpart peer computing device;

applying the change of the counterpart peer data object to the peer data object on the peer computing device; and sending a status of the applied change from the peer computing device to the counterpart peer computing device via the change notification clearing house.

2. The computer-implemented method of claim 1, further comprising: checking the counterpart peer computing device for authorization to synchronize with the peer computing device.

3. The computer-implemented method of claim 1, further comprising: setting up encryption parameters for communications between the peer computing device and the counterpart peer computing device.

4. The computer-implemented method of claim 1, further comprising: bringing the peer data object and the counterpart peer data object into a same state.

5. The computer-implemented method of claim 4, wherein bringing the peer data object and the counterpart peer data object into a same state comprises:

if data of the peer data object is newer than data of the counterpart peer data object, or if the counterpart peer data object does not exist, then transmitting a copy of the peer data object from the peer computing device to the counterpart peer computing device;

else if the data of the counterpart peer data object is newer than the data of the peer data object, or if the peer data object does not exist, then receiving a copy of the counterpart peer data object from the counterpart peer computing device, and updating the peer data object from the received copy of the counterpart peer data object.

6. The computer-implemented method of claim 4, wherein the peer data object comprises a first folder and the counterpart peer data object comprises a second folder, and wherein bringing the peer data object and the counterpart peer data object into the same state comprises:

bringing a third data object located within the first folder into a same state as a corresponding fourth data object located within the second folder; and receiving copies of the peer data object and the counterpart peer data object from the counterpart peer computing device, and if there is no corresponding data object within the first folder for each of the received copies, then creating a new data object within the first folder from the received copy.

7. The computer-implemented method of claim 1, wherein monitoring the peer data object comprises monitoring a first file for at least one of the following changes: an attribute of the first file is modified, data in the first file is modified, the first file is moved, and the first file is deleted.

8. The computer-implemented method of claim 1, wherein monitoring the peer data object comprises monitoring a first folder for at least one of the following changes: an attribute of the first folder is modified, a third data object is created within the first folder, the first folder is moved, and the first folder is deleted.

9. The computer-implemented method of claim 8, further comprising: monitoring the third data object within the first folder for changes.

10. The computer-implemented method of claim 9, wherein the changes to the third data object within the first folder comprise: an attribute of the third data object is modified, data in the third data object is modified, a fourth data object is created within the third data object, the third data object is moved, and the third data object is deleted.

11. The computer-implemented method of claim 9, further comprising:
if the third data object changes, then transmitting a notification of the change to the counterpart peer computing device.

12. The computer-implemented method of claim 1, wherein if the detecting a change in the peer data object of the peer computing device has an unexpected effect on the counterpart peer computing device, then warning a user of the peer computing device of the unexpected effect, the unexpected effect corresponding to an unanticipated modification to either the counterpart peer data object or its contents.

13. The computer-implemented method of claim 12, wherein:
the peer data object comprises a first folder and the counterpart peer data object comprises a second folder;
the change in the first folder comprises moving a third data object from within the first folder to a first location outside the first folder; and
warning a user comprises warning that the change would delete a fourth data object in the second folder, the fourth data object corresponding to the third data object, without creating a new data object on the counterpart peer computing device in a second location corresponding to the first location on the peer computing device.

14. The computer-implemented method of claim 12, wherein:
the peer data object comprises a first folder and the counterpart peer data object comprises a second folder;
the change in the first folder comprises moving a third data object from a first location outside the first folder to within the first folder; and
warning a user comprises warning that the change would create a new data object within the second folder, the new data object corresponding to the third data object, without deleting a fourth data object on the counterpart peer computing device in a second location corresponding to the first location on the peer computing device.

15. The computer-implemented method of claim 1, further comprising:
configuring a synchronization between the peer data object and a third data object on a third peer computing device;
if the peer data object is changed, then transmitting a notification of the change to the peer data object to the third peer computing device;
listening for a notification from the third peer computing device of a change to the third data object; and
if a notification of a change to the third data object is received, then applying the received change of the third data object to the peer data object.

16. The computer-implemented method of claim 1, wherein the peer data object comprises a ghost file, and a change of deleting, moving, or renaming the peer data object consists of deleting, moving, or renaming the ghost file, respectively.

17. The computer-implemented method of claim 1, wherein the peer data object comprises a ghost file, and a change to the peer data object is synchronized with the counterpart peer data object, wherein the change does not consist of deleting, moving, or renaming the ghost file.

18. A computer-implemented method of synchronizing data in a peer to peer computer system having a processor, memory, and a data storage subsystem, the computer-implemented method comprising:
providing a plurality of computing devices in the peer to peer computer system, the computing devices comprising a peer computing device and a counterpart peer computing device;
designating one of the computing devices as a change notification clearing house;
initiating data synchronization of a folder located within a peer data object of the peer computing device with the counterpart peer computing device comprising a counterpart peer data object, wherein the peer computing device and the counterpart peer computing device comprise a synchronization set;
initializing a data synchronization service on the peer computing device;
determining, via an application program interface of the peer computing device, if the folder is already being synchronized;
managing the data synchronization of the folder by the application program interface of the peer computing device, via an object of the synchronization set;
initializing a data synchronization service on the counterpart peer computing device;
determining, via an application program interface of the counterpart peer computing device, if a counterpart to the folder is already being synchronized on the counterpart peer computing device;
sending configuration information via the change notification clearing house to the counterpart peer computing device, wherein the counterpart peer computing device hosts synchronized copies of the folder; and
synchronizing changes of the folder on the peer computing device with the counterpart folder located on the counterpart peer computing device, wherein the synchronizing changes comprises a combination of full copy synchronization and ghost copy synchronization.

19. The computer-implemented method of claim 18, wherein the synchronizing changes further comprises: a full copy synchronization of the folder on the peer computing device with the counterpart folder located on the counterpart peer computing device, and a ghost copy synchronization of a file contained within the folder on the peer computing device with a file contained within the counterpart folder located on the counterpart peer computing device.

20. The computer-implemented method of claim 18, wherein the synchronizing changes further comprises: a full copy synchronization of the folder on the peer computing device with the counterpart folder located on the counterpart peer computing device, and a ghost copy synchronization of the folder on the peer computing device with a folder on a third device.

21. The computer-implemented method of claim 18, wherein the synchronizing changes further comprises: a full copy synchronization of metadata and attributes within the folder located on the peer computing device with the counterpart folder located on the counterpart peer computing device, and a ghost copy synchronization of bulk file changes made to the folder on the peer computing device with the counterpart folder located on the counterpart peer computing device.

22. The computer-implemented method of claim 18, further comprising: transmitting a collection of notifications of changes to the peer data object via the change notification clearing house from the peer computing device to the counterpart peer computing device on a basis comprising one of: a schedule, availability of the peer computing device to transmit notifications, and availability of the counterpart peer computing device to receive notifications.

23. The computer-implemented method of claim 18, further comprising: pausing a command to remove the peer computing device from the synchronization set until synchronization with the counterpart peer computing device is completed.

24. A system for synchronizing data in peer to peer computing systems having processors, memories and data storage subsystems, at least one of said peer to peer computing systems comprising:
   a file system comprising a plurality of data objects and a data synchronization service;
   a data synchronizer operable to detect changes in the plurality of data objects;
   an input/output manager to configure a plurality of communications channels, operable to transmit change notifications to a corresponding counterpart peer computing system, the change notifications received from file system drivers coupled to the data synchronizer; and
   a plurality of local storage drivers operable to apply changes to the plurality of data objects, resulting from changes made to corresponding data objects in the corresponding counterpart peer computing system, wherein the change notifications are transmitted over the communications channels configured by the input/output manager.

25. The system of claim 24, wherein one of the plurality of data objects comprises a ghosted file containing attributes and metadata of a corresponding full copy remote file located in the counterpart peer computing system, and wherein changes to the attributes and metadata of the ghosted file are synchronized to the corresponding data objects of the full copy remote file in the counterpart peer computing system.

* * * * *